(12) United States Patent
Beer et al.

(10) Patent No.: US 11,016,184 B2
(45) Date of Patent: May 25, 2021

(54) DEVICE FOR DETERMINING A DISTANCE FROM AN OBJECT, AND CORRESPONDING METHOD

(71) Applicant: Fraunhofer-Gesellschaft zur Foerderung der angewandten Forschung e.V., Munich (DE)

(72) Inventors: Maik Beer, Duisburg (DE); Olaf Schrey, Ratingen (DE); Werner Brockherde, Duisburg (DE); Alexander Schwinger, Essen (DE); Bedrich Hosticka, Muelheim a.d.Ruhr (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 371 days.

(21) Appl. No.: 15/969,070

(22) Filed: May 2, 2018

(65) Prior Publication Data
US 2018/0321363 A1 Nov. 8, 2018

(30) Foreign Application Priority Data

May 2, 2017 (DE) ...................... 10 2017 207 317.9

(51) Int. Cl.
*G01S 7/48* (2006.01)
*G01S 7/4865* (2020.01)
(Continued)

(52) U.S. Cl.
CPC .......... *G01S 7/4865* (2013.01); *G01S 7/4863* (2013.01); *G01S 7/4876* (2013.01); *G01S 17/10* (2013.01)

(58) Field of Classification Search
CPC . B60N 2/00; G01S 17/00; G01S 17/89; G01S 17/02; G01S 7/487; G01S 7/48; B60R 21/01
See application file for complete search history.

(56) References Cited

U.S. PATENT DOCUMENTS

| | | | | |
|---|---|---|---|---|
| 6,373,557 | B1* | 4/2002 | Mengel | G01S 17/894 356/4.07 |
| 2009/0185159 | A1* | 7/2009 | Rohner | G01S 7/4865 356/5.01 |
| 2015/0338270 | A1* | 11/2015 | Williams | G01J 1/44 250/214.1 |

FOREIGN PATENT DOCUMENTS

| | | |
|---|---|---|
| DE | 19833207 A1 | 2/2000 |
| DE | 102014207599 A1 | 10/2015 |

OTHER PUBLICATIONS

Bronzi, Danilo et al., "100 000 Frames/s 64 x 32 Single-Photon Detector Array for 2-D Imaging and 3-D Ranging", D. Bronzi et al.: "100 000 Frames/s 64 x 32 Single-Photon Detector Array for 2-D Imaging and 3-D Ranging"; IEEE J. Sel. Top. Quantum Electron.; vol. 20; No. 6; pp. 354-363; Nov. 2014, Nov. 2014, 354-363.

(Continued)

*Primary Examiner* — Luke D Ratcliffe
(74) *Attorney, Agent, or Firm* — Perkins Coie LLP; Michael A. Glenn

(57) ABSTRACT

The invention relates to a device for determining a distance from an object, including a transmission device for emitting several light pulses including a pulse duration, including a reception device for receiving signals and for generating detection signals, and including an evaluation device for evaluating the detection signals. The evaluation device determines, on the basis of a number of the light pulses emitted and on the basis of the detection signals, probability values of several time windows which each have a respec- (Continued)

tive time period equaling the pulse duration which relate to probabilities for reception of a signal within one of the time windows, respectively. In addition, the evaluation device determines, in accordance with the time-of-flight method, a measure of the distance of the object on the basis of the probability values determined. In addition, the invention relates to a corresponding method.

17 Claims, 9 Drawing Sheets

(51) Int. Cl.
  *G01S 7/4863* (2020.01)
  *G01S 7/487* (2006.01)
  *G01S 17/10* (2020.01)

(56) References Cited

OTHER PUBLICATIONS

Illade-Quinteiro, Julio et al., "Distance Measurement Error in Time-of-Flight Sensors Due to Shot Noise", J. Illade-Quinteiro et al.: "Distance Measurement Error in Time-of-Flight Sensors Due to Shot Noise"; Sensors; vol. 15; No. 3; pp. 4624-4642; Feb. 2015, Feb. 2015, 4624-4642.
Seitz, Peter, "Single-photon imaging", P. Seitz et al.: "Single-photon imaging"; Heidelberg; New York: Springer; 2011.
Villa, Federica et al., "CMOS Imager With 1024 SPADs and TDCs for Single-Photon Timing and 3-D Time-of-Flight", F. Villa et al.: "CMOS Imager With 1024 SPADs and TDCs for Single-Photon Timing and 3-D Time-of-Flight"; IEEE J. Sel. Top. Quantum Electron.; vol. 20; No. 6; pp. 364-373; Nov. 2014, 364-373.

* cited by examiner

DEVICE FOR DETERMINING A DISTANCE FROM AN OBJECT, AND CORRESPONDING METHOD

CROSS-REFERENCE TO RELATED APPLICATION

This application claims priority from German Patent Application No. DE 10 2017 207 317.9, which was filed on May 2, 2017, and is incorporated herein in its entirety by reference.

The invention relates to a device for determining a distance from an object. In addition, the invention relates to a method of determining a distance from an object.

BACKGROUND OF THE INVENTION

CMOS (Complementary metal-oxide semiconductor) image sensor technology offers possibilities of capturing measurement signals in real time at high speeds. This is highly beneficial when capturing three-dimensional (3D) distance images in time-critical systems. Pulse time-of-flight methods and methods comprising continually modulated light here serve to contactless depth sensing. To this end, the time of flight of light pulses, e.g. of infrared laser light, which are emitted by a transmission device and reflected by a target object, are measured by detecting the residual intensity. In this context, one speaks of Light Detection and Ranging (LIDAR).

Possible fields of application are: Advanced Driver Assistance Systems (ADAS), autonomous driving, security monitoring, avionics or medical technology.

Specifically in security-relevant systems, the demands placed upon reliability are high. For example, with emergency brake systems in automobiles, distances from objects located in front of the car may be reliably detected in real time. A high level of circuit complexity increases such a system's susceptibility to defects.

In addition, even relatively small objects may be reliably detected, and their directions of movement and speeds may be reliably estimated, by means of high-resolution 3D images. In this manner, the future position of an object may be predicted, and a collision may be more effectively prevented. Also in security monitoring, high-resolution images offer decisive advantages. For example, they allow more reliable detection of objects or persons by means of algorithms, which reduces the frequency of false alarms.

Single-photon avalanche diodes (SPAD) are avalanche photodiodes operated above their breakdown voltages (avalanche voltages). Within this so-called Geiger range, one single photon, which is absorbed within the active range of the diode and generates a free charge carrier, will suffice for resulting in the breakdown of the diode and, therefore, in a macroscopic flow of current through the diode. SPADs thus enable detection of single photons.

Known 3D sensors based on applying SPAD employ various principles.

In an indirect method, the incident light is integrated, similarly to a classical photodiode, which in the context of SPADs is implemented by counting the incident photons. This method is possible with pulse-shaped and sine-shaped modulation of the light intensity. Following integration, the time of flight and, therefore, the distance are calculated from the counts of various time windows [1].

Due to the statistic distribution of the photons, the individual counts are subject to Poisson distribution, which results, as a function of the expected value, in a certain amount of uncertainty regarding distance measurement [2].

With direct methods, the time of flight of the emitted light is detected by means of an electronic timer (time-to-digital converter, TDC). In this context, the TDC is started with emission of a short light pulse, and is stopped with receiving the pulse reflected at the target object [1]. Stopping the TDC is performed, in the first-photon method, with the first incident photon detected by the sensor after the TDC has been started.

In an ideal case, the measured time t corresponds to the time of flight of light, and may be directly converted to the distance d between the sensor and the target object on the basis of the speeds of the light pulses c across $d=c*t/2$.

A problem may arise when the method described is used, when there is background light which has the same wavelength as the laser used. For example, the background light is sunlight or artificial illumination in the case of utilization in an automobile. In this case, there is the possibility that a photon resulting from the background light stops the TDC and in this manner results in erroneous measurement.

The disadvantage of both methods is the relatively large amount of expenditure in terms of circuitry that may be used for implementation. For example, the indirect method involves several counters in order to operate in a time-efficient manner, which counters may have relatively large widths (e.g. 10 bits) for reducing variance [3]. The expenditure in terms of circuitry is even larger and more complex for the direct method, which involves a TDC for measuring the time of flight of the pulse [4].

SUMMARY

According to an embodiment, a device for determining a distance from an object may have: a transmission device for emitting several light pulses having definable pulse duration, a reception device for receiving signals and for generating detection signals associated with detection times and/or detection time intervals, and an evaluation device for evaluating the detection signals, the evaluation device determining, on the basis of a number of the light pulses emitted and on the basis of the detection signals, probability values of several time windows which each have a respective time period equaling the pulse duration and which relate to probabilities for reception of a signal within one of the time windows, respectively, and wherein the evaluation device determines a measure of the distance of the object on the basis of the probability values determined in accordance with the time-of-flight method.

According to another embodiment, a method for determining a distance from an object may have the steps wherein several light pulses are emitted which have predefinable pulse durations, wherein signals are received, wherein as a result of the received signals, detection signals associated with detection times and/or detection time intervals are generated, wherein on the basis of a number of the light pulses emitted and on the basis of the detection signals, probability values of several time windows are determined, wherein the probability values relate to probabilities of reception of a signal within one of the time windows in each case, wherein a length of time of the time windows equals the pulse duration, and wherein on the basis of the probability values determined, a measure of the distance of the object is determined in accordance with the time-of-flight method.

The device comprises at least one transmission device, one reception device and one evaluation device.

The transmission device is configured to emit several light pulses comprising predefinable pulse durations. The reception device is configured to receive signals and to generate detection signals associated with detection times and/or detection time intervals. The reception device thus generates detection signals, each of which is associated with a point in time or a time interval. Whether what is at hand is a point in time or a time interval also depends on the implementation and, e.g., on the temporal resolution. The evaluation device is configured to evaluate the detection signals. For this purpose, the evaluation device advantageously falls back on associating the detection signals with a point in time and/or a time interval. On the basis of a number of the emitted light pulses and on the basis of the detection signals, the evaluation device determines probability values of several time windows. The time windows each have a time period (length of time) which is equal to the pulse durations of the light pulses. The probability values relate to probabilities for receiving a signal within one of the time windows in each case. In addition, the evaluation device determines, on the basis of the probability values determined, a measure of the distance of the object in accordance with the time-of-flight method.

Thus, the evaluation device defines time windows and determines the probability of signals being received within the time windows in each case. In one implementation, the evaluation device determines the number of signals received within the respective time windows on the basis of the associated points in time and/or time intervals. The number of signals received per respective time window divided by the number of the light pulses emitted results, in one implementation, in the probability of receiving signals within the time windows.

As opposed to conventional technology, the device may be implemented with reduced electronics in the pixel. For example, counters or TDC, which in conventional technology may be used for enabling distance measurement by means of SPADs, are dispensed with. The reduction in hardware is of particular importance to two-dimensional arrays and enables a higher filling factor as well as higher pixel numbers with an identical surface areas, or smaller sensors with the same number of pixels.

In one implementation, the number of light pulses for measuring the distance ranges from 100 to 1000.

In accordance with one implementation, the evaluation device determines a measure of a background light. The background light combines light signals which originate from the measurement environment and are, in particular, light pulses which are not reflected at the object while nevertheless being detected by the reception device and resulting in detection signals. On the basis of the determined probability values of two among the several time windows and on the basis of the determined measure of the background light, the evaluation device determines the measure of the distance of the object. Thus, for determining the distance, the evaluation device uses—only, in particular—the probability values of two designated time windows and the measure of the background light. This implementation, or the measurement method underlying the implementation, will be referred to as the first measurement method below.

One implementation consists in that the evaluation device determines the probability values of several time windows which are directly consecutive in terms of time.

In accordance with one implementation, the evaluation device determines the probability values of three time windows. On the basis of the determined probability values of two among the three time windows and on the basis of the determined probability value of a third time window as a measure of the background light, the evaluation device determines the measure of the distance of the object. In this implementation, the probability values are determined for three time windows which are advantageously directly consecutive. In one implementation, the first time window starts at the time of emitting a light pulse. In one implementation, the probability value of the third and, therefore, last time window in terms of time is the measure of the background light.

In accordance with one implementation, the evaluation device determines the probability values of three time windows which are directly consecutive in terms of time, a beginning of a first time window among the three time windows being defined by a time of emission of a light pulse. The evaluation device determines the value of a time of flight of the light pulse from the transmission device to the object and from the object to the reception device on the basis of the following formula:

$$T_{TOF} = T_P \frac{\ln(1-P_2) - \ln(1-P_3)}{\ln(1-P_1) + \ln(1-P_2) - 2\ln(1-P_3)},$$

The following designations are used:

The time of flight is designated by $T_{TOF}$. The pulse duration is designated by $T_p$. The determined probability values of the three time windows are designated by $P_1$, $P_2$ and $P_3$. Eventually, ln is used for designating the natural logarithm.

One implementation consists in that the evaluation device determines the probability values of more than three time windows—which in one implementation are directly consecutive in terms of time. On the basis of the probability values determined for the time windows, the evaluation device identifies a time window wherein lies a start of a detection of a light pulse reflected at the object. The evaluation device determines an averaged probability value as the above-mentioned measure of the background light from the probability values of those time windows which differ from the identified time window and from a time window which immediately follows the identified time window. On the basis of the determined probability values of the identified time window and the subsequent time window as well as on the basis of the averaged probability value, the evaluation device determines the measure of the distance of the object.

One implementation consists in that the evaluation device identifies the time window comprising the start of the detection of the light pulse reflected at the object by determining the time window having the highest probability value and by comparison with—advantageously immediately—adjacent time windows.

In a further implementation, the time window comprising the start of the detection of the light pulse reflected at the object is identified in that the time window having the maximum probability value is determined and in that the probability values of the time window which directly precedes said time window and of the time window which immediately follows said time window are compared with one another. Thus, these are the immediately adjacent time windows.

In accordance with one implementation, the evaluation device determines a value of a time of flight of the light pulse from the transmission device to the object and from the object to the reception device on the basis of the following formula:

$$T_{TOF} = T_P(n-1) + T_P \frac{\ln(1 - P_{n+1}) - \ln(1 - \overline{P})}{\ln(1 - P_n) + \ln(1 - P_{n+1}) - 2\ln(1 - \overline{P})}$$

The following designations are used:

The time of flight is designated by $T_{TOF}$. The pulse duration is designated by $T_p$. The determined probability value of the identified time window is designated by $P_n$. The determined probability value of the subsequent time window is designated by $P_{n+1}$. The averaged probability value is designated by $\overline{P}$. A position of the identified time window within a sequence, which begins at the time of emitting the light pulse and with a first time window designated by n=1, of the temporally consecutive time windows is designated by n. ln designates the natural logarithm.

One implementation consists in that the evaluation device determines the probability values of several time windows, some of which partly mutually overlap due to a predefinable mutual time offset. The evaluation device determines a value of a time of flight of the light pulse from the transmission device to the object and from the object to the reception device on the basis of the determined probability values, and determines the measure of the distance of the object on the basis of the determined value of the time of flight. The measurement method on which the implementation is based will be referred to as the second measurement method below. In one implementation, the probability values are determined for mutually overlapping time windows only.

In accordance with one implementation, the evaluation device identifies, on the basis of the determined probability values, a time window having a largest probability value. The evaluation device determines the value of the time of flight on the basis of the temporal position of the identified time window.

In an alternative implementation, the evaluation device identifies, on the basis of the determined probability values, a time range having a probability value of 100% and determines, on the basis of the time range, the value of the time of flight. Thus, the evaluation device determines a range wherein the probability values in a graphic representation form a rectangle as a function of time. Said rectangle thus enables determining the time of flight by determining, in one implementation, the temporal center of the rectangle.

Two measurement methods were discussed in the above-mentioned implementations:

In a first measurement method, the probability values of two time windows as well as a measure of the background light were processed. One implementation additionally provides for the probability values of subsequent time windows to be determined.

In a second measurement method, the probability values for overlapping time windows are determined. The overlap results, e.g., from the fact that a time window of a specified width, which equals the pulse duration, is offset along the time axis by a predefinable time offset.

In the following implementation, both measurement methods are combined. In particular, only one measurement method is employed for distance measurement. For a subsequent measurement, which in one implementation relates, in particular, to a further evaluation of the existing detection signals, the measurement method will either be maintained or replaced by the other measurement method.

Therefore, one implementation consists in that the evaluation device is configured to determine the distance from the object either by means of a first measurement method on the basis of determined probability values of two time windows and a determined measure of a background light, or by means of a second measurement method with partly overlapping time windows. Thus, the evaluation device may employ either the first measurement method or the second measurement method. The evaluation device determines an assessment value once the distance has been currently determined by using the first measurement method or the second measurement method. The evaluation device will then compare the assessment value to a predefinable threshold value. If the assessment value and the predefinable threshold value differ from each other within a predefinable tolerance range, the evaluation device will maintain, for a determination of the distance which follows the current determination, the measurement method which is used for the current determination. In the—inverse—event that the assessment value and the predefinable threshold value differ from each other beyond the predefinable tolerance range, the evaluation device will use the first measurement method or the second measurement method for a determination which follows the current determination, depending on whether the assessment value is larger or smaller than the predefinable threshold value.

In one implementation, the evaluation device determines, from the determined probability values, the largest probability value as the assessment value.

In accordance with one implementation, the evaluation device will use the first measurement method for the determination following the current determination if the assessment value is smaller than the predefinable limiting value. If the assessment value is larger than the predefinable limiting value, the evaluation device will use the second measurement method for the determination following the current determination.

One implementation provides for the evaluation device to use time windows having the same lengths of times in the first measurement method and in the second measurement method. With both measurement methods, therefore, in particular the pulse durations of the light pulses are identical, so that the measurement method here relates to only the evaluation and/or the generation of the detection signals.

In one implementation, the reception device comprises at least one signal-photon avalanche diode.

In addition, the invention achieves the object of defining a method of determining a distance from an object.

The method includes at least the following steps:
wherein several light pulses are emitted which comprise predefinable pulse durations,
wherein signals are received,
wherein as a result of the received signals, detection signals associated with detection times and/or detection time intervals are generated,
wherein on the basis of a number of the light pulses emitted and on the basis of the detection signals, probability values of several time windows are determined,
wherein the probability values relate to probabilities of reception of a signal within one of the time windows in each case,
wherein a length of time of the time windows equals the pulse duration, and wherein on the basis of the probability values determined, a measure of the distance of the object is determined in accordance with the time-of-flight method.

Specifically, there are a multitude of possibilities of implementing and developing further the inventive device as well as the method.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
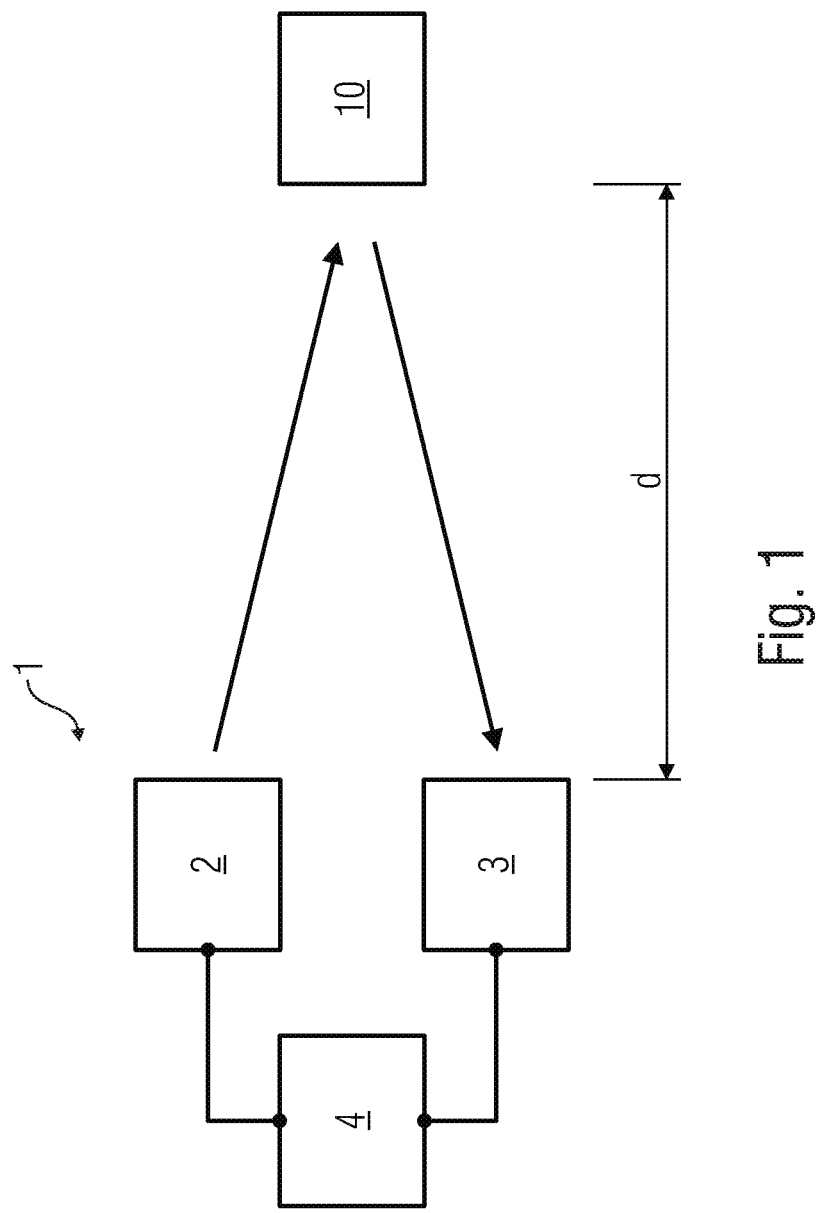
FIG. 1 shows a schematic representation of a device for determining a distance from an object.

An implementation of a device 1 for determining a distance d from an object 10 is shown in FIG. 1. The device 1 comprises a transmission device 2 and a reception device 3. The transmission device 2 emits light pulses of the pulse duration $T_p$ in the direction of the object 10, the light pulses in the implementation shown being pulsed infrared laser light. In one implementation, the transmission device 2 moves the light across a predefinable area of the object 10.

The light reflected at the object 10 is received as a signal by the reception device 3. The path of the light here is indicated by two arrows. The distance measurement method discussed below is based on determining the probability of a photon or, generally, a signal being detected within a given time window. To this end, a light pulse having the pulse duration $T_p$ is emitted by the transmission device 2, is reflected at the object 10 at the distance d and is received by a detector as the reception device 3 following the time of flight $T_{TOF}$. The time of flight of the light will then yield the distance d from the object 10 via the speed c of the signals which are irradiated, reflected and received again.

The evaluation device 4 is connected, for determining the distance d, to the transmission device 2 and the reception device 3.

Figure 2:
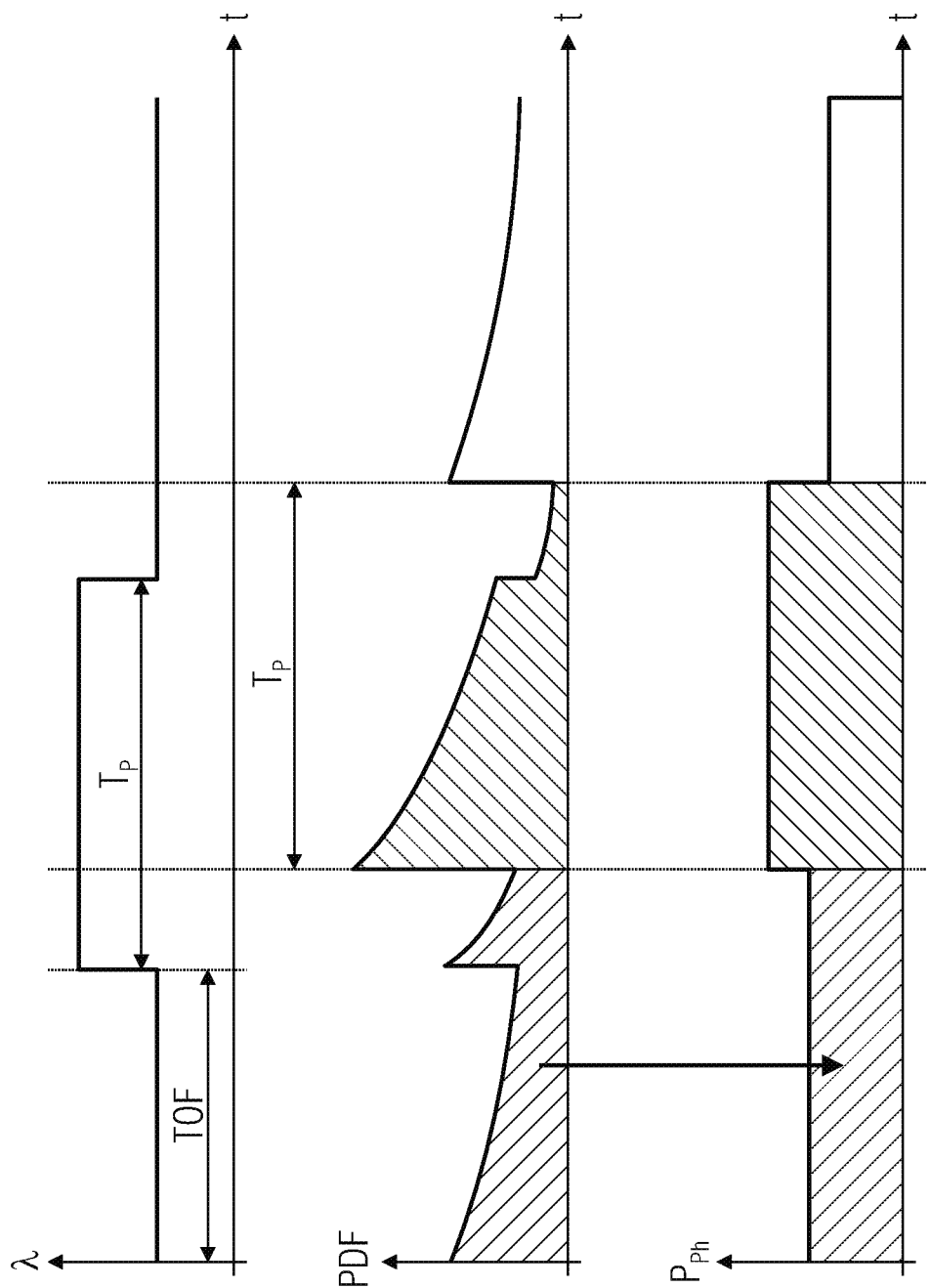
FIG. 2 shows a schematic representation of the functional principle of distance measurement based on photon statistics.

FIG. 2 shows an implementation wherein the probability of photon detection and/or of reception of a signal is determined in the evaluation device for three time windows which are arranged to be directly consecutive. The time period (an alternative designation is the width) of the time windows corresponds to the pulse width $T_p$, respectively. The starting time of the first time window is defined by the time of emission of the light pulse. The probability values are determined by determining whether or not a photon was detected during the corresponding time window.

By means of multiple repetitions across many light pulses, the probability $P_i$ of photon detection within the respective time window is calculated, from the binary results of the individual measurements, by using the index i (i=1, 2, 3) in accordance with the formula $$P = k_i/N \tag{1}$$

with the number N of light pulses and the number $k_i$ of light pulses at which a photon was detected within the corresponding time window having the index i.

Thus, a light pulse is emitted, and following reception of a signal, a detection signal is generated which is associated with a point in time or a time interval. This is performed an N number of times. Subsequently, it is determined how many detection signals are associated with the time windows (here with the three time windows). This will then result in a respective number of detection signals per time window, which in turn will result in the respective probability value.

The maximum time of flight of the light pulse is limited, in the utilization of three time windows which is depicted in FIG. 2, to the pulse and/or window durations. This ensures that within the third time window, only photons are received due to possibly existing background light and that the reception probability which is thus determined may be used for improving the resistance to background light. Therefore, the third time window provides a measure of the background light.

The time of flight of the light pulse is calculated, from the determined reception probabilities $P_i$ with i=1, 2, 3 of the three time windows, in accordance with the following formula:

$$T_{TOF} = T_P \frac{\ln(1-P_2) - \ln(1-P_3)}{\ln(1-P_1) + \ln(1-P_2) - 2\ln(1-P_3)} \tag{2}$$

This calculation formula (2) results from the probabilities of photon reception within the three time windows, which in turn may be derived from the exponential distribution of the times of arrival of the first photon detection.

In principle, the probability density distribution (probability density function, PDF) of the intermediate arrival times of two photons is defined, in a photon flux of constant intensity, by the following exponential distribution function:

$$P_{PDF}(t,\lambda) = \lambda \exp(-t\lambda) \tag{3}$$

According to the hitchhiker's paradox, the same distribution also applies to the duration between any point in time and the arrival of the next photon.

The probability of detecting a photon within a window of the duration $T_p$ results from an integration by means of the formula (3) of t=0 to t=$T_p$:

$$P_{Ph}(T_p,\lambda) = \int_0^{T_p} P_{PDF}(t,\lambda)dt = 1 - \exp(-T_p\lambda). \tag{4}$$

By analogy, the probabilities of photon detection within the three time windows may be calculated:

$$P_1 = 1 - \exp(-\lambda_A(T_p - T_{TOF}) - T_p\lambda_B),$$

$$P_2 = 1 - \exp(T_{TOF}\lambda_A - \lambda_B T_p) \text{ and}$$

$$P_3 = 1 - \exp(-\lambda_B T_p). \tag{5}$$

In this context, $\lambda_A$ is the photon detection rate of the reflected light pulse, and $\lambda_B$ is the photon detection rate of the background light.

Formula (2) may be derived from the probabilities of formulae (5). From the time of flight of the pulse which has thus been determined, the distance d between the transmission device and/or the reception device and the target object may subsequently be determined by means of the following formula:

$$d=c*T_{TOF}/2.$$

To promote understanding, FIG. 2 shows three time waveforms one above the other.

The top row schematically depicts the detection rate λ as a function of time t. In accordance with the time of flight TOF of the light pulses, the detection rate for the pulse duration $T_p$ clearly increases and subsequently decreases. In this context, the three time windows have the same length in time, which in each case is equal to the pulse duration $T_p$ of the light pulse.

The central row shows the associated probability density function (PDF) for the three time windows.

The bottom row each shows the integral which results for the three time windows. Within the first time window, the detection of the light pulses reflected at the object starts. In the second and, therefore, central time window, the probability of signal detection increases to a maximum. In the third time window, eventually only or at least mainly background light is detected.

For assessing the method described, the variance of time-of-flight measurement is calculated in accordance with formula (2).

The variance of the probability of the respective time window $P_i$ results from the binomial distribution. In this context, detection of a photon and/or of a signal within the time window concerned is evaluated to be a successful attempt. The probability of this is determined by the formula (5). After all, the number of attempts N corresponds to the number of light pulses emitted.

Thus, the following applies in terms of variance:

$$\sigma_i^2 = \frac{P_i(1-P_i)}{N}. \quad (6)$$

The variance of formula (2) results from the sum of the respective variances multiplied by the squares of the partial derivations of formula (2) in accordance with the corresponding probability $P_i$ to yield:

$$\sigma_{ToF}^2 = \frac{1}{N\lambda_A^2 T_p^2}\left(\frac{T_{TOF}^2 P_1}{(1-P_1)} + \frac{(T_P - T_{TOF})^2 P_2}{(1-P_2)} + \frac{(T_P - 2T_{TOF})^2 P_3}{(1-P_3)}\right) \quad (7)$$

Equation (7) shows a challenge presented by the method described:

With very high detection rates, the detection probability within the measurement window concerned tends toward 100%. In according with formula (7), this results in that the variance tends toward infinite. Due to the square increase in the rate of a reflected light pulse as the distance decreases, this results in difficulties in particular with short distances. By means of suitable signal processing, this issue may be solved to the effect that with probabilities close to 100% within the first two time windows, the respective measurement will be characterized as invalid.

One possibility of being able to measure the distance, in particular with high detection rates, despite the problem described, is presented by the second measurement method described above and below.

The method introduced of measuring the distance by determining the probability of photon detection within a given time window enables reducing the hardware that may be used since no counters and/or TDCs are necessary as opposed to the known indirect and direct measurement methods. Reducing the circuit complexity reduces the measurement system's susceptibility to defects and enables designing high-resolution sensors having a higher filling factor while requiring the same amount of space.

Figure 3:
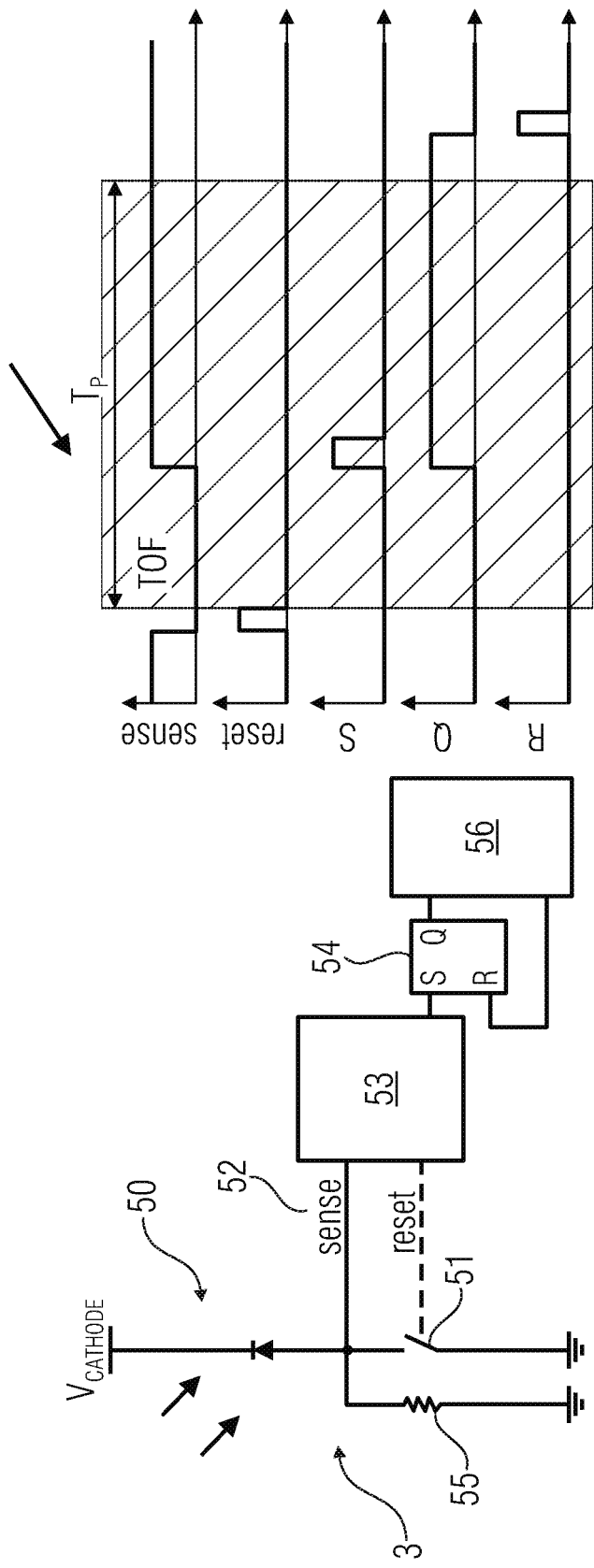
FIG. 3 shows a block diagram of an exemplary controlling of an SPAD with the associated temporal waveforms.

One embodiment with regard to controlling a single-photon avalanche diode (or SPAD for short) 50 as the actual reception element is shown in FIG. 3 by way of example.

For photon detection within the measurement windows, one implementation uses SPADs since they are ideally suited for the described method thanks to their high sensitivity in terms of detecting single photons. Each pixel of the reception device 3 contains at least one SPAD 50 as well as further electronics for controlling and reading out data.

In principle, two methods of controlling the SPAD are possible:

If the SPAD 50 is reset directly before each measurement window, the dead time of the diodes does not play any part in the function. The time of flight may be calculated in accordance with formula (2).

Alternatively, the SPAD 50 may also be operated in the free-running mode, wherein the SPAD is automatically reset directly following detection of a photon and following expiry of the dead time, and in this manner may detect a next photon. Here, the rate of detected photons is reduced due to the dead time. An advantage of this approach is that consecutive windows may be sensed within the same measurement cycle since resetting of the SPAD prior to the start of the next window is dispensed with.

Resetting prior to the measurement window will be discussed in the context of FIG. 3.

As was already discussed, the SPAD 50 is reset prior to every measurement window (this is the hatched area in FIG. 3). This is effected, in the present exemplary circuit, by opening a switch 51 which connects the anode of the SPAD 50 to ground in a low-impedance manner (reset). Thus, the potential $V_{CATHODE}$ is applied across the SPAD 50. The potential here is above the breakdown voltage of the diode 50. Therefore, the SPAD 50 is in the Geiger mode and is ready for receiving a photon.

If a photon is detected within the measurement window (this is indicated by the dash-dotted line in FIG. 3 pointed to by an arrow), the diode 50 will break down, and the potential at the sense node 52 will rise.

This increase in voltage is registered by the control logic 53, which sets the following RS flipflop 54. At the same time, the current flow causes the voltage across the resistor 55 to increase. The latter results in a reduction in the diode voltage to below the breakdown voltage and therefore causes the current flow to be quenched.

Interruption of the diode current may be effected as fast as possible so as to reduce the probability of afterpulsing, which describes renewed triggering of the SPAD 50 following resetting without any incident photon being involved.

The set flipflop 54 serves as a memory and remembers whether or not a photon was detected during the measurement window in question.

Following the end of the measurement window, the state of the flipflop 54 is read out by means of digital signal processing (DSP) 56 and is subsequently reset.

Repeating the described process several times enables determining the probability of photon detection within the time window in question.

An alternative is the free-running mode:

In the event of a free-running SPAD, the diode will be automatically reset following detection of a photon and expiry of a hold-off time, so that a further photon may be detected. Under the influence of dead time, the rate of detected photons decreases as follows:

$$\Lambda = \frac{\lambda}{1 + \lambda T_{dead}} \quad (8)$$

with the effective detection rate $\Lambda$, the detection rate of a dead-time-free SPAD $\lambda$ and the dead time $T_{dead}$.

The dead time describes the period of inactivity of an SPAD following detection of a photon and is composed of the time for quenching the diode current, the hold-off time for reducing afterpulsing, and the time for resetting the diode.

During resetting, the voltage applied across the SPAD is charged to reach its original value, which is above the breakdown voltage. In addition, due to the dead time, the PDF of the first photon detection changes as follows:

$$P_{PDF}(t, \lambda, T_{dead}) = \begin{cases} \Lambda & \text{for } 0 \le t \le T_{dead} \\ \Lambda \exp(-\lambda(t - T_{dead})) & \text{for } t > T_{dead} \end{cases} \quad (9)$$

with the effective photon detection rate $\Lambda$ in accordance with formula (8).

Formula (9) results in a probability of photon detection within a time window having the same length of time as the pulse duration $T_p$ of:

$$P_{Ph}(T_P, \lambda, T_{dead}) = \quad (10)$$
$$\begin{cases} \Lambda T_P & \text{for } 0 \le T_P \le T_{dead} \\ \Lambda T_{dead} + 1 - \frac{\Lambda}{\lambda}\exp(-\lambda(T_P - T_{dead})) & \text{for } T_P > T_{dead} \end{cases}$$

Even under the influence of dead time, the reception probability is a monotonically increasing function and will therefore allow reconstructing of the original detection rate.

However, the probability in formula (10) only applies if the detection rate $\Lambda$ was already constant for a certain amount of time prior to the beginning of the measurement window. However, if the rate increases heavily from a comparatively small value in the middle of a measurement window, the probability will be different since given an increase in the rate, the SPAD will be less likely to be in dead time.

This results in the problem that at the beginning of the reflected pulse, it is more likely for a photon to be detected and for the reception probability within the window in question to tend toward 100% despite dead time if the photon rate of the reflected light pulse is very high.

Implementations which allow achieving a measurement having a higher distance resolution despite saturation will be described below.

Figure 4:
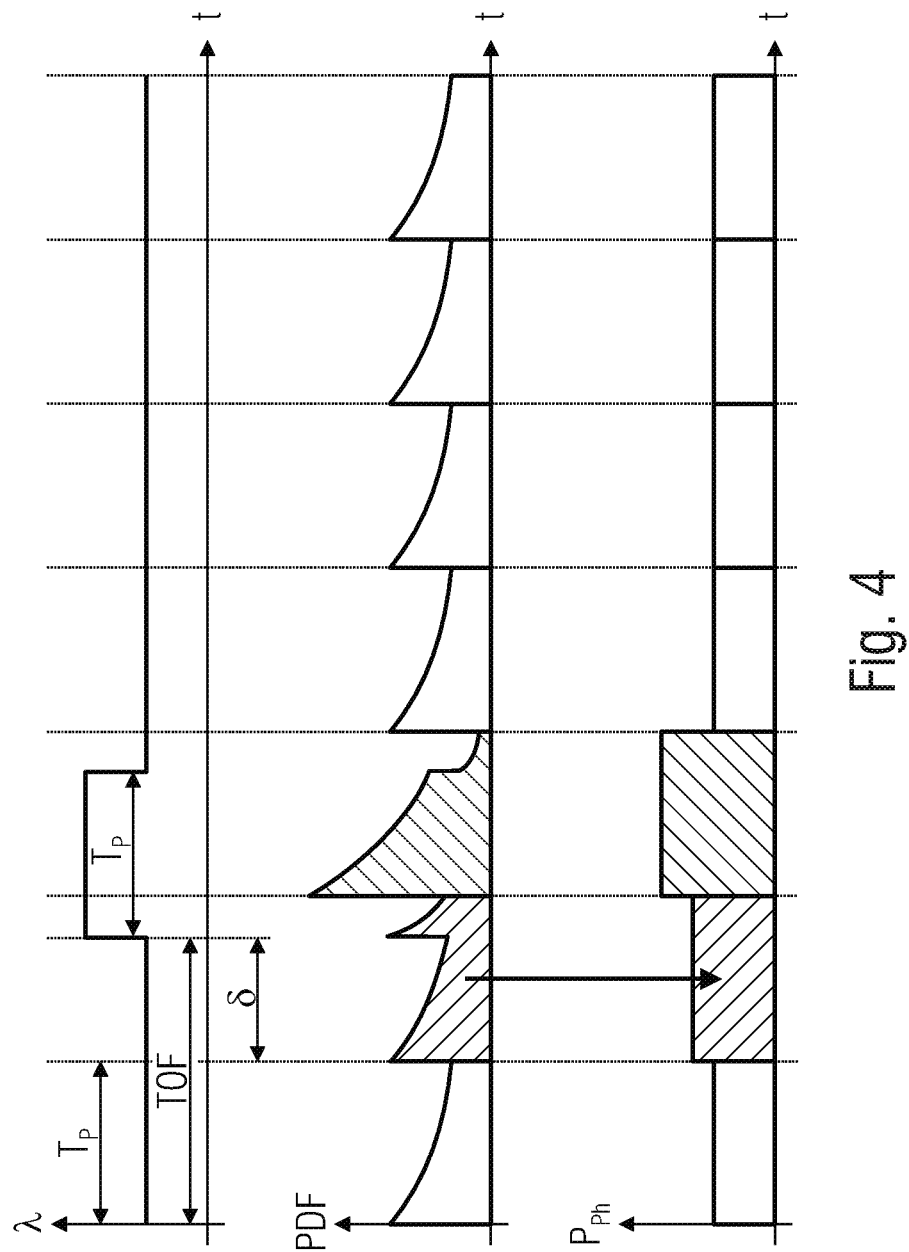
FIG. 4 shows a schematic representation of the functional principle of distance measurement based on photon statistics with a larger number of windows.

What follows initially is a description of an implementation having an increased number of windows comprising time-of-flight interpolation in combination with FIG. 4. The principle of representation of FIG. 4 is analogous to the principle of FIG. 2.

What is to be noted, in particular, in FIG. 4 are the central and bottom rows, where the increased number of windows is striking. The lengths of time of the windows continue to be the same as those of the pulse durations $T_p$ of the emitted light pulses. The larger probability values are associated with the second and the third time windows. Detection of the start of a reflected light pulse starts within the second time window. However, the largest probability is associated with the third time window, into which falls the major part of the light pulse with its pulse duration.

By limiting the range to the duration of the emitted light pulse in the implementation depicted in FIG. 2, large ranges involve correspondingly long pulse durations. From points of view of eye safety, a longer light pulse comes with a reduction in the maximum emission performance, which in turn results in a smaller signal-to-background ratio (SBR) and, consequently, in an increased level of susceptibility to background radiation. Increasing the range while maintaining the pulse duration is achieved—as will be explained below and is depicted in FIG. 4—by increasing the number of windows.

If one uses a larger number of windows, the position of the received light pulse may initially be determined by means of a suitable algorithm. In the simplest case, the position of the light pulse is associated with the window having the maximum probability (which here is the third time window). Once the position is found, the time of flight will already be known with a resolution corresponding to the pulse and/or window width.

If a larger number of windows is used, the probability of photon detection will be sensed in several time windows by the background light alone. By using the mean value of said time windows, the variance of time-of-flight interpolation may be improved.

Those time windows which directly follow each other shall be numbered in an ascending manner starting from the time of emission of the light pulse.

If the start of the reflected light pulse lies within window n (the following applies in FIG. 4: n=2), the following shall apply for the partial time of flight $\delta$:

$$\delta = T_P \frac{\ln(1 - P_{n+1}) - \ln(1 - \overline{P})}{\ln(1 - P_n) + \ln(1 - P_{n+1}) - 2\ln(1 - \overline{P})} \quad (11)$$

In this context, the mean value of all windows which have sensed background photons only is given by:

$$\overline{P} = \frac{1}{N_{Win} - 2} \sum_{\substack{k=1 \\ k \ne n, n+1}}^{N_{Win}} P_k \quad (12)$$

with the number of time windows $N_{Win}$.

Thus, the mean value is formed across those time windows which are different from both selected windows: the time window comprising the start of reception of the reflected light pulse, and the time window directly adjacent to it.

For determining the overall time of flight of the emitted light pulse and, thus, the distance between the sensor and the target object, the temporal shift by (n−1) time windows may be added to the partial time of flight δ.

Thus, the following applies with regard to the time of flight:

$$T_{TOF} = \delta + T_p(n-1). \tag{13}$$

When using several windows, the interpolation in accordance with formula (2) may be interrupted during the pulse—unlike the case of using only three windows—in the event of very high photon rates, and instead, a partial time of flight of $\delta = T_p/2$ may be assumed. As a result, measurement with reduced distance resolution is possible despite saturation of the measurement windows in which the reflected light pulse was received. Since in this case, the resolution is determined by the window width, the resolution may be achieved in a refined manner by reducing said window width. Thus, a resolution of the distance of 75 cm may be achieved with a window width of, e.g., 5 ns.

The extent to which the width of the measurement windows may be reduced also depends on the technology employed. Basically, resolutions within the one-digit centimeter range involve window widths within the range of sub-nanoseconds.

The determination, which may initially be used, of the position of the light pulse from the determined probabilities of all measurement windows results in an additional source of errors of time-of-flight determination. By using specific algorithms it is possible to minimize said source of errors within certain limits, which is why the variance continues to be determined mainly by formula (7). To this end, one may employ filters, for example, or one may use information from the preceding frames.

Unlike short distances and the associated high detection rate of the reflected light pulse, saturation does not pose a problem for the range of the system. Instead, what is important here is the distance up to which the reflected pulse may be found in the probability values of the measurement windows. This depends on the algorithm which is appropriate for said purpose, and this is to be shown here by way of example by using a simple variant.

We start on the basis of the assumption that the algorithm interprets the time window having the maximum probability as being one of those time windows within which the light pulse was received following reflection. Subsequently, the probability that the temporal position of the light pulse is not correctly determined may be calculated as follows:

$$P_{Fail} = \sum_{\zeta=0}^{n} dP_{12}(k \leq \zeta) P_{BG}(k > \zeta) \text{ with} \tag{14}$$

$$dP_{12}(k \leq \zeta) = P_1(k \leq \zeta + 1) P_2(k \leq \zeta + 1) - P_1(k \leq \zeta) P_2(k \leq \zeta), \tag{15}$$

$$P_{1(2)}(k \leq \zeta) = \sum_{i=0}^{\zeta} P_B(i, n, P_{1(2)}) \text{ and}$$

$$P_{BG}(k > \zeta) = 1 - P_B\left(0, N_{Win} - 2, \sum_{i=\zeta+1}^{n} P_B(i, n, P_{BG})\right)$$

as well as the binomial distribution $P_B$ (i,n,p). Said binomial distribution indicates the probability that i attempts will be successful out of n attempts having a probability of success of p.

Formula (14) indicates the probability that one of ($N_{Win}$−2) windows having an expected value of $P_3$ of formula (5), has a higher value than the two windows within which the pulse was received with the expected values $P_1$ and $P_2$, respectively, of formula (5).

When assuming that in the case of an erroneous position determination, the measurement value will be equally distributed across the entire distance range, the variance of the measurement may be evaluated by means of a weighted addition of the variance in accordance with formula (7) and of equal distribution, the weighting being performed in accordance with error probability (14).

Thus, the following applies in terms of variance:

$$\sigma_d^2 = \left(\frac{c}{2}\right)^2 \sigma_{ToF}^2 (1 - P_{Fail}) + \frac{d_{max}^2}{12} P_{Fail}. \tag{16}$$

Figure 5:
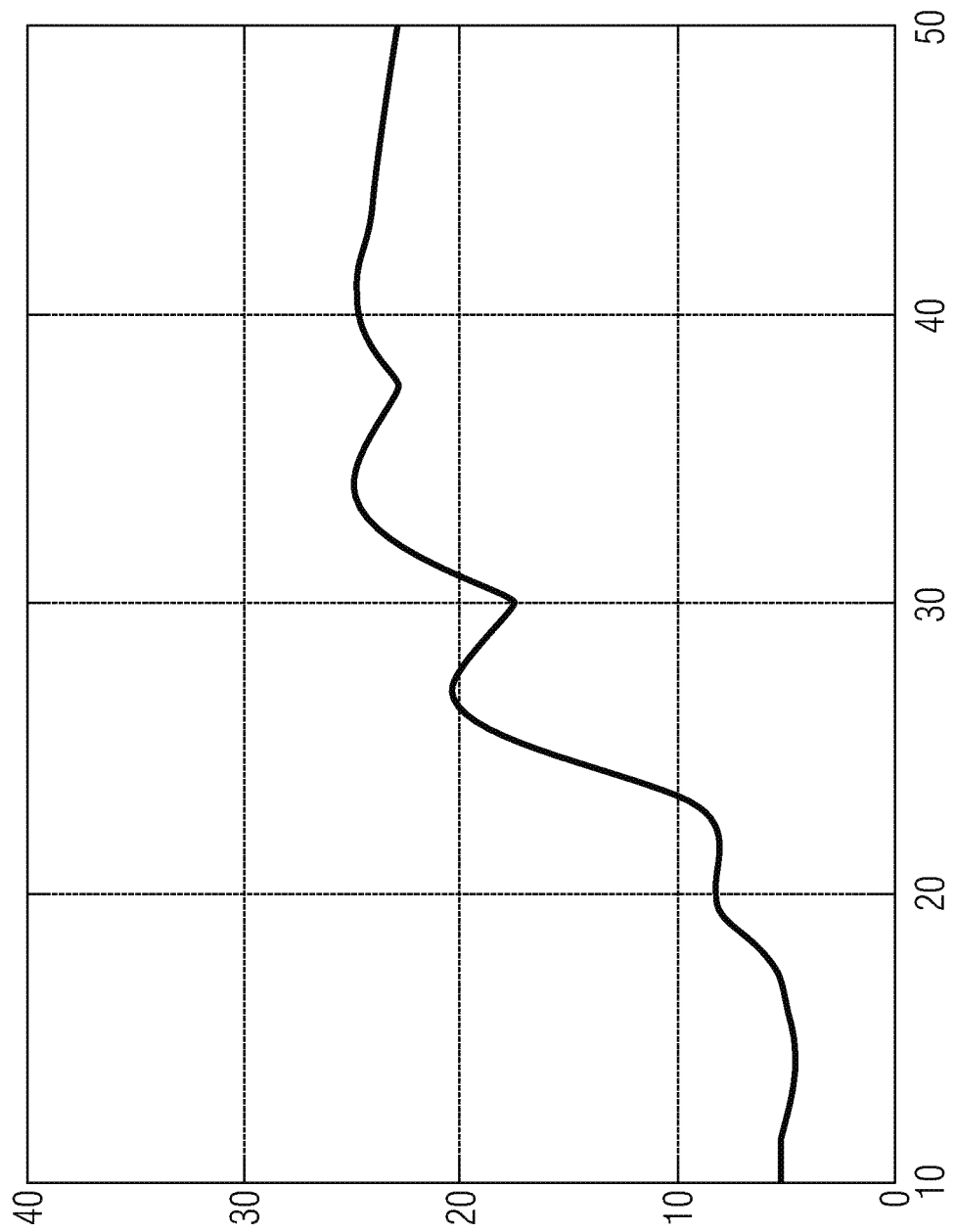
FIG. 5 shows a curve of standard deviation of distance measurement as a function of the distance.

FIG. 5 shows the standard deviation $\sigma_d$ in accordance with formula (16) for a maximum distance of 50 m with 8 windows having widths of $T_p$=50 ns, a detection rate of the background of $\lambda_B$=5 MHz, and of the reflected pulse of $\lambda_A$(d=10 m)=50 MHz, wherein $\lambda_A \propto d^{-2}$.

What is plotted in FIG. 5 is the proportional standard deviation as a function of the distance in meters. The range may be determined by specifying a maximum standard deviation. For example, for $\sigma_{max}$=10%, a range of 23 m results.

An alternative in terms of increasing the range of the system while keeping the pulse width constant is to perform a time shift in the measurement windows in time increments Δt with Δt<$T_p$ across the entire measurement range. The alternative may be referred to as time shifting without any time-of-flight interpolation. The term "second measurement method" will also be employed below.

Figure 6:
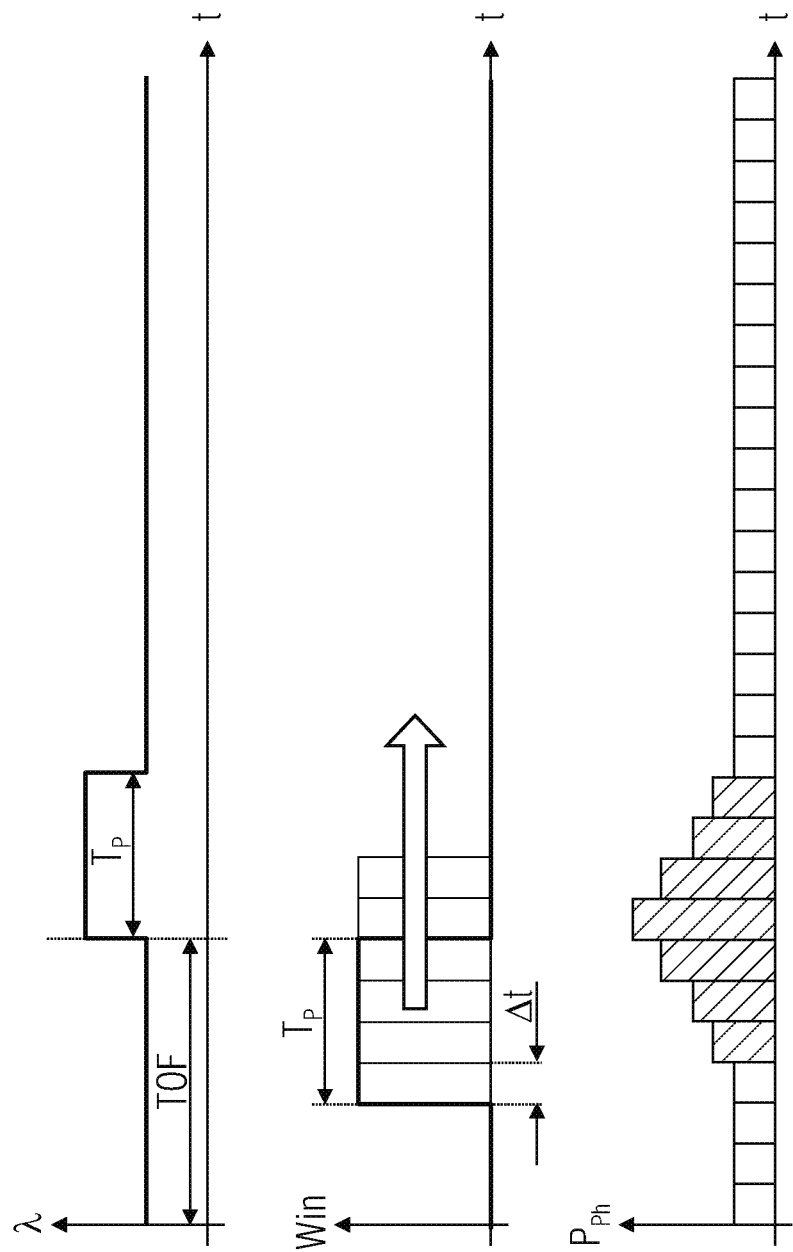
FIG. 6 shows a schematic representation of the functional principle of distance measurement with overlapping time windows.

The principle is shown by FIG. 6.

The time curve of the uppermost row shows the detection rate A as a function of the time t. Following the time of flight TOF of the light pulses, the detection rate for the pulse duration $T_p$ clearly increases and decreases again (see also FIGS. 2 and 4).

The central row shows the pertinent time windows which are shifted in relation to one another by the time increment Δt. This is indicated by the arrow. The length in time of the time window is the same in each case and equals to the pulse duration $T_p$.

The bottom row shows the determined probabilities associated with the individual time windows.

For each position of the measurement window, the probability of photon detection is determined. The time of flight of the light pulse is subsequently determined, from the probability values, by means of a suitable algorithm, which searches, e.g., for the position of the window having the maximum probability. Here, a resolution of the time-of-flight measurement in accordance with time increment Δt is achieved without any interpolation. Given an overlap of the measurement windows by e.g. 333 ps, a distance resolution of 5 cm may be achieved.

By dispensing with time-of-flight interpolation between two measurement windows, the problem of saturation with high detection rates does not arise.

In the histogram, the received pulse in this case is represented as a rectangle since even with a merely partial coverage of the pulse, a probability close to 100% is measured. By means of suitable signal processing, a resolution of Δt is achieved here as well. In this case, provision is made, in one implementation, for the temporal center of the rectangle as seen in the histogram to be determined rather than the window having the maximum probability.

In order to establish whether there is a saturation of the measurement windows, i.e. a very high detection rate during the light pulse, the value of the window having the maximum probability value may be considered and a comparison with adjacent windows may be performed.

If there is saturation, the start and the end of the pulse are determined, in one implementation, by forming the difference between adjacent windows, and the time of flight is determined therefrom.

Since in the event of a small time offset $\Delta t$, saturation in most cases does not immediately occur upon contact of the measurement window with the received pulse, one implementation exploits the resulting increase in the probability values for interpolating the time of flight. In this manner, a resolution smaller than $\Delta t$ may be achieved.

A combination of the two previously mentioned methods will be described by means of FIG. 7.

When using several windows with additional interpolation (i.e. with the first measurement method), the temporal resolution of the time-of-flight measurement will be reduced, in the event of very high photon rates of the reflected light pulse, to the pulse and/or window width, which may amount to several 10 ns, depending on the detection rates to be expected. In terms of the distance, this corresponds to a resolution of up to several meters, which in most applications is not a tolerable value.

Since a reduction in the window width to the sub-nanosecond range turns out to be very difficult, depending on the technology used, the method involving the overlapping time windows (i.e. the second measurement method) may be used instead. In this case, the window width is not modified, and instead the windows overlap by the duration $\Delta t$, which now presents the temporal resolution of the time-of-flight measurement.

When using the method comprising time shifting (or, the second measurement method involving overlapping time windows), many more time windows may be measured, which entails a larger amount of expenditure in terms of circuitry or, alternatively, a reduction of the frame rate.

Since one advantage of the method presented here consists in the low circuit complexity, time shifting is implemented by a smaller frame rate.

For this reason, switching between the two measurement methods (the first measurement method involving the measure of the background light, and the second measurement method involving the overlapping time windows) should advantageously only be done if there is a need to do so. In one implementation, said need may be established by evaluating the measured reception probabilities within the individual measurement windows.

Figure 7:
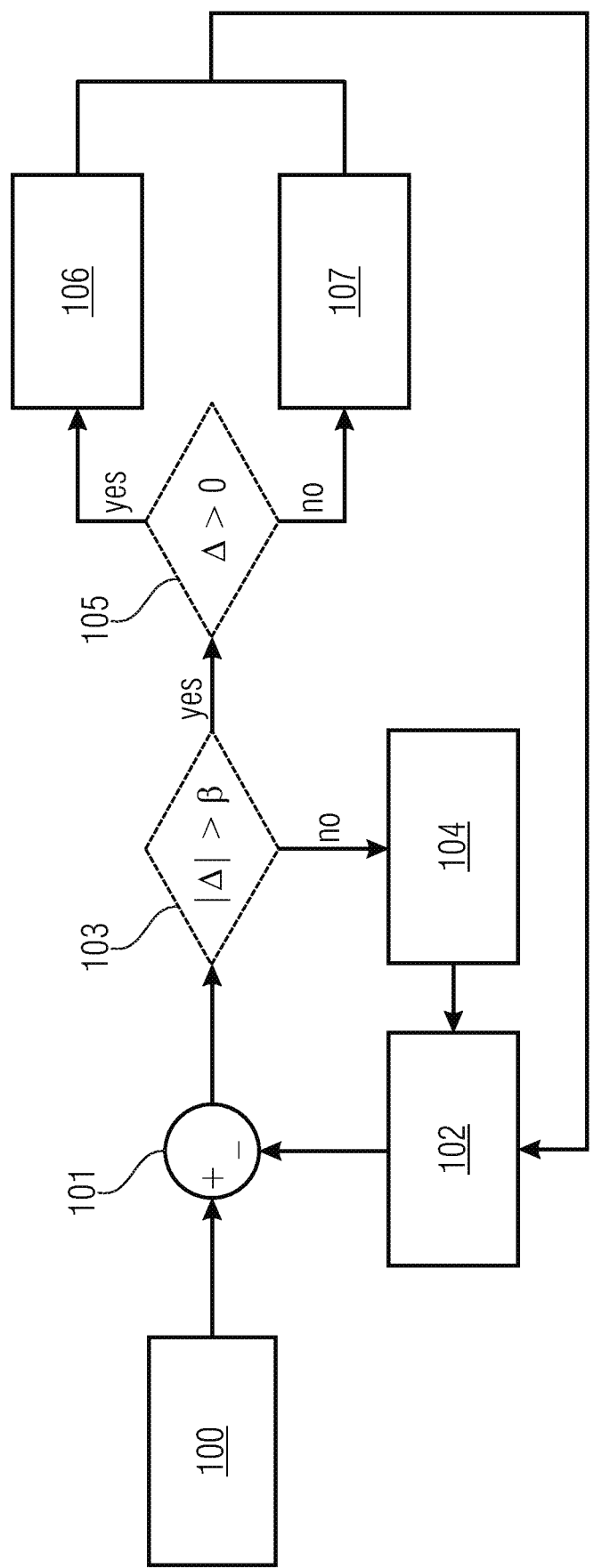
FIG. 7 shows a schematic representation of an implementation of a control algorithm for selecting a suitable measurement method.

For the control algorithm, presented in FIG. 7, for selecting the suitable measurement method, step 100 comprises setting a limiting value of the probability; when said value is exceeded, a switch to the time-shifting method—i.e. to the second measurement method—is effected. The same principle is also applied to switching back to the first measurement method, for which the limiting value is fallen below. In order to prevent constant switching between both methods, a hysteresis is used for a tolerance range.

Step 101 initially comprises forming the difference $\Delta$ from the set limiting value (e.g. 85%) and the maximum probability of all measurement windows—as an example of an assessment value provided by step 102.

Step 103 comprises comparing the assessment value to the limiting value. The question whether or not the deviation lies outside a tolerance range here is answered by the question of whether or not the amount of the difference is larger than a hysteresis $\beta$.

If the amount of the difference $\Delta$ is below the hysteresis $\beta$ (e.g. 5%), the current measurement method will be maintained (this is the NO branch following the comparison 103). Therefore, step 104 comprises performing a measurement as before, which again will lead to determining the assessment value in step 102.

In contrast, if the deviation is higher, the corresponding measurement method will be employed as a function of the sign of the difference. Said consideration of the sign in step 105 thus provides information on whether the assessment value (the maximum probability) is larger or smaller than the predefined limiting value.

If the difference is positive, the maximum probability will be clearly below the limiting value, as a result of which interpolation of the time of flight will be possible, and the corresponding method involving interpolation—i.e. the first measurement method with step 106—will be employed.

If the difference is negative, the maximum probability will be clearly above the limiting value, which signifies a high variance of the interpolation. Therefore, step 107 comprises using the second measurement method, i.e. the time-shifting method.

By switching between both measurement methods, a resolution corresponding to the window overlap $\Delta t$ may be achieved even in the near range despite saturation.

When switching to the time-shifting method, which is effected at short distances, the frame rate of the measurement will decrease. When switching to the time-shifting method, the number of measurement windows will increase by the factor $(T_p/\Delta t)$. When assuming that the number of measured time windows remains the same in each cycle, the frame rate will decrease by the same factor. However, since in the case of time shifting, there is no interpolation of the distance, a higher variance of the measured probabilities is tolerable, which in accordance with formula (6) allows a small number of individual measurements N and, thus, counteracts frame-rate reduction.

In principle, depending on the application, a trade-off may be found between the distance resolution, the frame rate and the circuit complexity.

Figure 8:
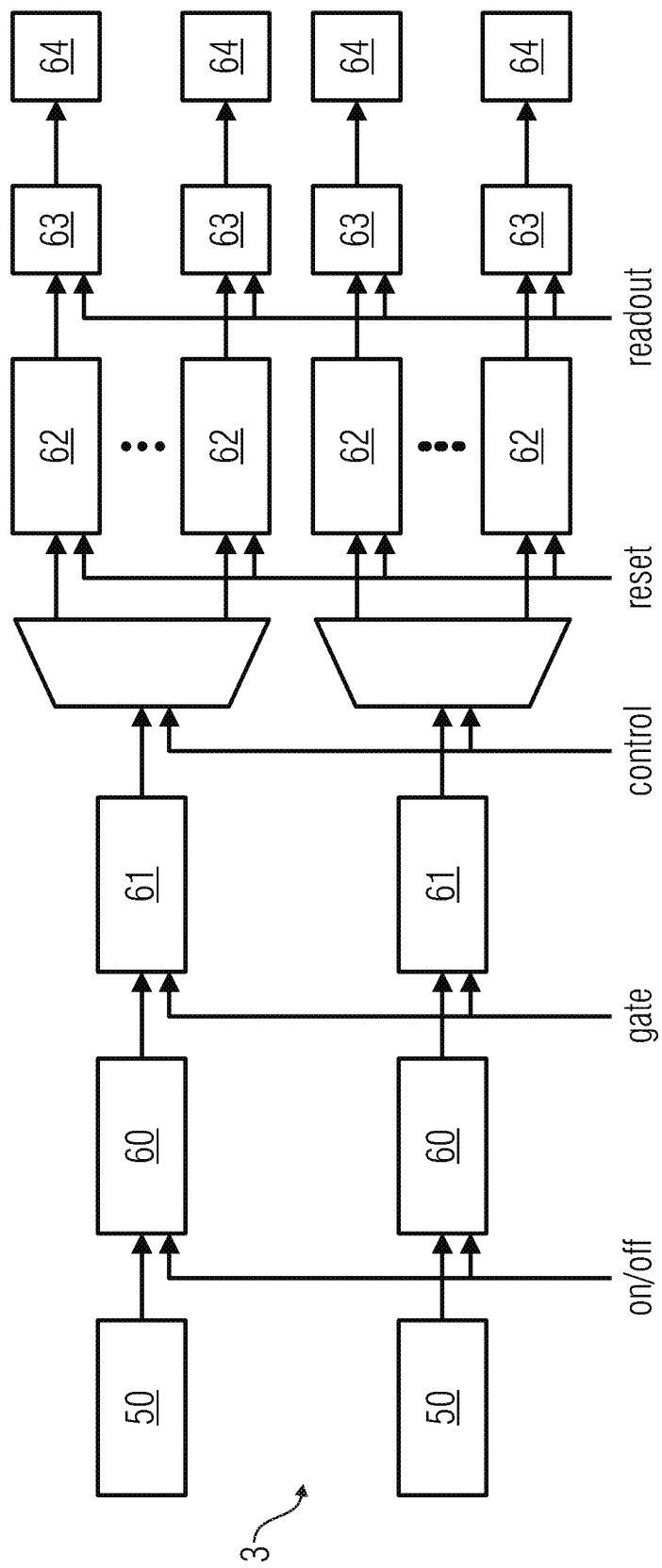
FIG. 8 shows a block diagram of a sensor pixel.

FIG. 8 shows an implementation of the method by using a CMOS sensor.

The block diagram of a sensor pixel for realizing the described implementation is depicted as part of a reception device 3 in FIG. 8.

Here, SPADs 50 serve to detect photons within the measurement windows. For quenching the diode current and resetting the SPAD 50 following detection, a controllable active quenching-and-resetting circuit (AQR) 60 is used. Resetting of the diode 50 may be deactivated via the control signal, so that the SPAD 50 may be operated in accordance with the first measurement method and the second measurement method.

A subsequent gating circuit 61 serves to allow output signals of the AQR 60 to pass only within a clearly specified time window, so that the measurement window may be accurately defined.

In case photons are detected within the defined time range, the flipflop 62 associated with the measurement window will be set and will thus store whether or not a photon has been sensed. By means of a multiplexer, switching is performed between the flipflops 62 of the individual measurement windows.

To increase measurement efficiency, several SPADs 50 are employed per pixel, each SPAD comprising the wiring described. Consequently, the variance of the probability measurement in accordance with formula (6) decreases by the factor N, N representing the number of SPADs 50.

Following the end of each individual measurement, i.e. of measuring all of the time windows across a light pulse cycle, the flipflops 62 are read out from an FPGA via a transmission gate (TG) 63. This involves reading out all of the flipflops 62 of one pixel in parallel, so that the minimum readout speed results from the light pulse rate and the number of pixels.

Depending on the number of pixels present within the reception device 3 and on the potential readout rate, the flipflops 62 of the individual SPADs are serially read out in one implementation, which reduces the number of pads 64 that may be used. The number of flipflops 62 per SPAD 50 here corresponds to the number of windows, so that all of the time windows may be measured in a directly successive manner. Thus, for a line sensor having 128 pixels and a laser pulse rate of 10 kHz, a minimum readout speed of 1.28 MHz results.

Due to the switching of the output signal of the gating circuit 61 to the various flipflops 62, the circuit is permanently ready to receive (cf. free-running mode). Summing of the read out measurement values is performed in counters implemented within the FPGA. In this manner, the probability of photon detection within the measurement window is determined from the sum formed across many individual measurements, and the distance in turn is determined on the basis of said probability.

Figure 9:
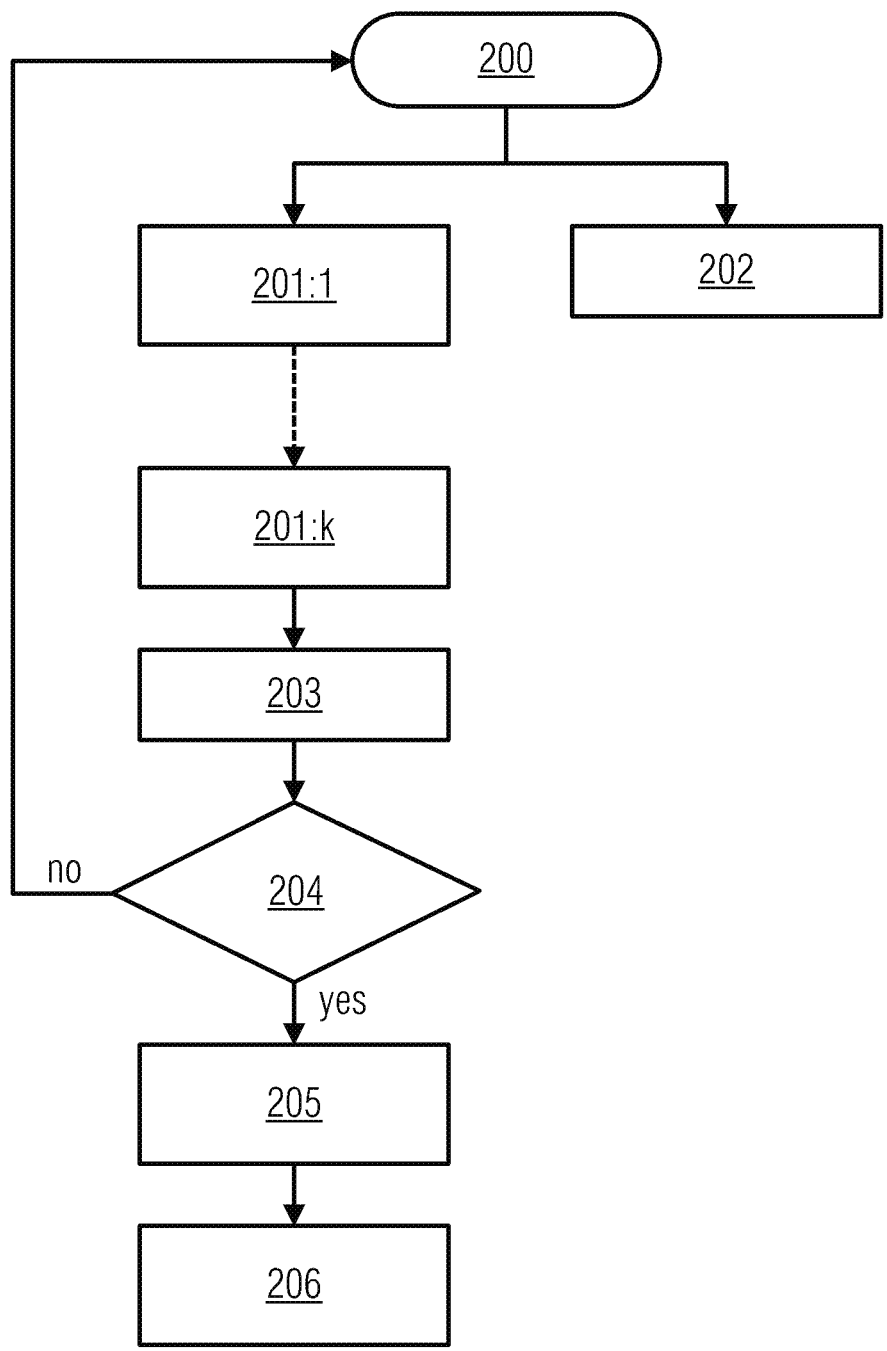
FIG. 9 shows a flowchart of a measurement with k flipflops across several individual measurements.

FIG. 9 shows the described procedure of the measurement as a flowchart.

Step 200 comprises the start. Step 201:1 comprises performing a measurement with the flipflop 1. At the same time, a light pulse is emitted in step 202. Step 201:1 is followed by further measurements with the subsequent flipflops for such time until a measurement with the $k^{th}$ flipflop has taken place in step 201:k. Step 203 comprises reading out the flipflops. Step 204 comprises checking whether sufficient individual measurements have been performed. In the negative case, the procedure returns to step 200. In the positive case, step 205 will comprise determining the probabilities for the time windows, and step 206 will comprise evaluating them.

In order to implement the time shifting described, the measurement may be delayed in time increments of $\Delta t$ for emitting the light pulse. If this is performed in several increments up to an overall delay of $(T_p - \Delta t)$, the entire measurement range will be covered.

Due to the limitation in the number of flipflops, the frame rate will decrease in this case since $(T_p/\Delta t)$ cycles of the light pulse may be used in order to achieve complete individual measurement.

Given a window width of $T_p = 50$ ns and an overlap of $\Delta t = 1$ ns, which corresponds to a distance resolution of 15 cm, the frame rate will decrease by the factor of 50 when switching to the time-shifting method.

As was mentioned before, since interpolation is omitted in the time-shifting method, a higher variance of the measured probability is tolerable, which is why the actual reduction of the frame rate may be less pronounced. Since the very high detection rates and, thus, switching to the time-shifting method occur only in the event of short distances, the range of the system may be limited in this case. This reduces the number of measurement windows that may be used and allows a higher frame rate.

In addition to the mentioned embodiment of an integrated CMOS sensor, the method presented may also be implemented by means of silicon photon multipliers (SiPM) or avalanche diodes, in an integrated manner or in a manner in which they are distributed with discrete components, and as a mere computer program. The method may also be employed in 3D hybrid integration by means of wafer-to-wafer, chip-to-wafer or chip-to-chip bonding with associated readout combinatorics and in various technologies such as CMOS or III-V semiconductors in different structural sizes.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device. Some or all of the method steps may be performed by a hardware device (or while using a hardware device), such as a microprocessor, a programmable computer or an electronic circuit. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or actually do cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier. In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded. The data carrier or the digital storage medium or the computer-readable medium are typically tangible, or non-volatile.

A further embodiment of the inventive method thus is a data stream or a sequence of signals representing the computer program for performing any of the methods described herein. The data stream or the sequence of signals may be configured, for example, to be transferred via a data communication link, for example via the internet.

A further embodiment includes a processing means, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] P. Seitz and A. J. P. Theuwissen, Eds., Single-photon imaging. Heidelberg; New York: Springer, 2011.
[2] J. Illade-Quinteiro, V. M. Brea, P. López, D. Cabello, and G. Doménech-Asensi, "Distance Measurement Error in Time-of-Flight Sensors Due to Shot Noise," Sensors, vol. 15, no. 3, pp. 4624-4642, February 2015.
[3] D. Bronzi et al., "100 000 Frames/s 64×32 Single-Photon Detector Array for 2-D Imaging and 3-D Ranging," IEEE J. Sel. Top. Quantum Electron., vol. 20, no. 6, pp. 354-363, November 2014.
[4] F. Villa et al., "CMOS Imager With 1024 SPADs and TDCs for Single-Photon Timing and 3-D Time-of-Flight," IEEE J. Sel. Top. Quantum Electron., vol. 20, no. 6, pp. 364-373, November 2014.

The invention claimed is:

1. Device for determining a distance from an object, comprising a transmission device for emitting several light pulses comprising definable pulse duration,
  comprising a reception device for receiving signals and for generating detection signals associated with detection times and/or detection time intervals, and
  comprising an evaluation device for evaluating the detection signals,
  the evaluation device determining, on the basis of a number of the light pulses emitted and on the basis of the detection signals, probability values of several time windows which each comprise a respective time period equaling the pulse duration and which relate to probabilities for reception of a signal within one of the time windows, respectively, and
  wherein the evaluation device determines a measure of the distance of the object on the basis of the probability values determined in accordance with the time-of-flight method.

2. Device as claimed in claim 1,
  wherein the evaluation device determines a measure of a background light, and
  wherein the evaluation device determines the measure of the distance of the object on the basis of the determined probability values of two among the several time windows and on the basis of the determined measure of the background light.

3. Device as claimed in claim 2,
  wherein the evaluation device determines the probability values of several time windows which are directly consecutive in terms of time.

4. Device as claimed in claim 2,
  wherein the evaluation device determines the probability values of three time windows and
  wherein the evaluation device determines the measure of the distance of the object on the basis of the determined probability values of two among the three time windows and of the determined probability value of a third time window as a measure of the background light.

5. Device as claimed in claim 2,
  wherein the evaluation device determines the probability values of three time windows which are directly consecutive in terms of time,
  a beginning of a first time window among the three time windows being defined by a time of emission of a light pulse,
  wherein the evaluation device determines the value of a time of flight of the light pulse from the transmission device to the object and from the object to the reception device on the basis of the following formula:

$$T_{TOF} = T_P \frac{\ln(1 - P_2) - \ln(1 - P_3)}{\ln(1 - P_1) + \ln(1 - P_2) - 2\ln(1 - P_3)},$$

wherein the time of flight is designated by $T_{TOF}$,
  wherein the pulse duration is designated by $T_p$,
  wherein the determined probability values of the three time windows are designated by $P_1$, $P_2$ and $P_3$, and
  wherein ln is used for designating the natural logarithm.

6. Device as claimed in claim 2,
  wherein the evaluation device determines the probability values of more than three time windows,
  wherein the evaluation device identifies, on the basis of the probability values determined for the time windows, a time window comprising a start of a detection of a light pulse reflected at the object,
  wherein the evaluation device determines an averaged probability value as the measure of the background light from the probability values of those time windows which differ from the identified time window and from a time window which immediately follows the identified time window, and
  wherein the evaluation device determines the measure of the distance of the object on the basis of the determined probability values of the identified time window and of the subsequent time window as well as on the basis of the averaged probability value.

7. Device as claimed in claim 6, wherein the evaluation device identifies the time window comprising the start of the detection of the light pulse reflected at the object by determining the time window comprising the highest probability value and by comparison with adjacent time windows.

8. Device as claimed in claim 6, wherein the evaluation device determines a value of a time of flight of the light pulse from the transmission device to the object and from the object to the reception device on the basis of the following formula:

$$T_{TOF} = T_P(n-1) + T_P \frac{\ln(1-P_{n+1}) - \ln(1-\overline{P})}{\ln(1-P_n) + \ln(1-P_{n+1}) - 2\ln(1-\overline{P})}$$

wherein the time of flight is designated by $T_{TOF}$,
wherein the pulse duration is designated by $T_p$,
wherein the determined probability value of the identified time window is designated by $P_n$,
wherein the determined probability value of the subsequent time window is designated by $P_{n+1}$,
wherein the averaged probability value is designated by $\overline{P}$,
wherein a position of the identified time window within a sequence, which begins at the time of emitting the light pulse and with a first time window designated by n=1, of the temporally consecutive time windows is designated by n, and
wherein ln designates the natural logarithm.

9. Device as claimed in claim 1, wherein the evaluation device determines the probability values of several time windows, some of which at least partly mutually overlap due to a predefinable time offset,
wherein the evaluation device determines a value of a time of flight of the light pulse from the transmission device to the object and from the object to the reception device on the basis of the determined probability values, and
wherein the evaluation device determines the measure of the distance of the object on the basis of the determined value of the time of flight.

10. Device as claimed in claim 9, wherein the evaluation device identifies, on the basis of the determined probability values, a time window comprising a largest probability value, and
wherein the evaluation device determines the value of the time of flight on the basis of the temporal position of the identified time window.

11. Device as claimed in claim 9, wherein the evaluation device identifies, on the basis of the determined probability values, a time range comprising a probability value of 100% and determines the value of the time of flight on the basis of said time range.

12. Device as claimed in claim 9, wherein the evaluation device is configured to determine the distance from the object either by means of a first measurement method on the basis of determined probability values of two time windows and a determined measure of a background light, or by means of a second measurement method with partly overlapping time windows,
wherein the evaluation device determines an assessment value once the distance has been currently determined by using the first measurement method or the second measurement method,
wherein the evaluation device compares the assessment value to a predefinable threshold value,
wherein the evaluation device, if the assessment value and the predefinable threshold value differ from each other within a predefinable tolerance range, will maintain, for a determination of the distance which follows the current determination, the measurement method which is used for the current determination,
wherein the evaluation device, in the event that the assessment value and the predefinable threshold value differ from each other beyond the predefinable tolerance range, will use the first measurement method or the second measurement method for a determination which follows the current determination, depending on whether the assessment value is larger or smaller than the predefinable threshold value.

13. Device as claimed in claim 12, wherein the evaluation device determines, as the assessment value, the largest probability value among the probability values determined.

14. Device as claimed in claim 12, wherein the evaluation device will use the first measurement method for the determination following the current determination if the assessment value is smaller than the predefinable limiting value, and
wherein the evaluation device will use the second measurement method for the determination following the current determination if the assessment value is larger than the predefinable limiting value.

15. Device as claimed in claim 12, wherein the evaluation device uses, in the first measurement method and in the second measurement method, time windows comprising the same lengths of time.

16. Device as claimed in claim 1, wherein the reception device comprises at least one single-photon avalanche diode.

17. Method for determining a distance from an object, wherein several light pulses are emitted which comprise predefinable pulse durations,
wherein signals are received,
wherein as a result of the received signals, detection signals associated with detection times and/or detection time intervals are generated,
wherein on the basis of a number of the light pulses emitted and on the basis of the detection signals, probability values of several time windows are determined,
wherein the probability values relate to probabilities of reception of a signal within one of the time windows in each case,
wherein a length of time of the time windows equals the pulse duration, and
wherein on the basis of the probability values determined, a measure of the distance of the object is determined in accordance with the time-of-flight method.

* * * * *